United States Patent [19]

Lindaberry

[11] Patent Number: 4,821,448
[45] Date of Patent: Apr. 18, 1989

[54] LURE ACTION ATTACHMENT FOR FISHING RODS

[75] Inventor: Harold Lindaberry, Mansfield, Pa.

[73] Assignee: Harlind and Sandlind Development Company, Mansfield, Pa.

[21] Appl. No.: 217,340

[22] Filed: Jul. 11, 1988

[51] Int. Cl.⁴ ............................................ A01K 87/00
[52] U.S. Cl. ...................................... 43/19.2; 43/26.1; 43/25
[58] Field of Search ..................... 43/19.2, 17.1, 26.1, 43/25

[56] References Cited

U.S. PATENT DOCUMENTS

| | | | |
|---|---|---|---|
| 3,789,534 | 2/1974 | Yankaitis | 43/19.2 |
| 4,120,112 | 10/1978 | McBain | 43/26.1 |
| 4,547,991 | 10/1985 | Searcy | 43/25 |
| 4,660,317 | 4/1987 | Evans | 43/26.1 |
| 4,700,501 | 10/1987 | Bryan | 43/26.1 |

Primary Examiner—Kurt Rowan
Attorney, Agent, or Firm—Paul Lipsitz

[57] ABSTRACT

A fishing line lure activator device adapted to fit a fishing rod having a battery driven motor which drives an eccentric wheel and a guide wheel in alignment with the eccentric wheel over which wheels a fishing line is looped to impart a swimming action to the lure in the water.

5 Claims, 1 Drawing Sheet

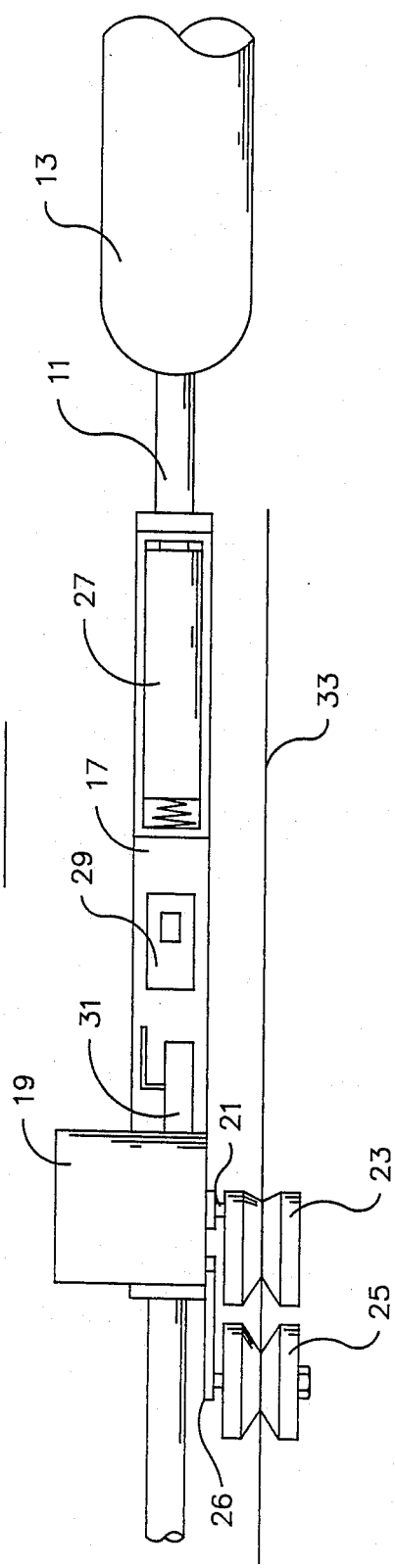
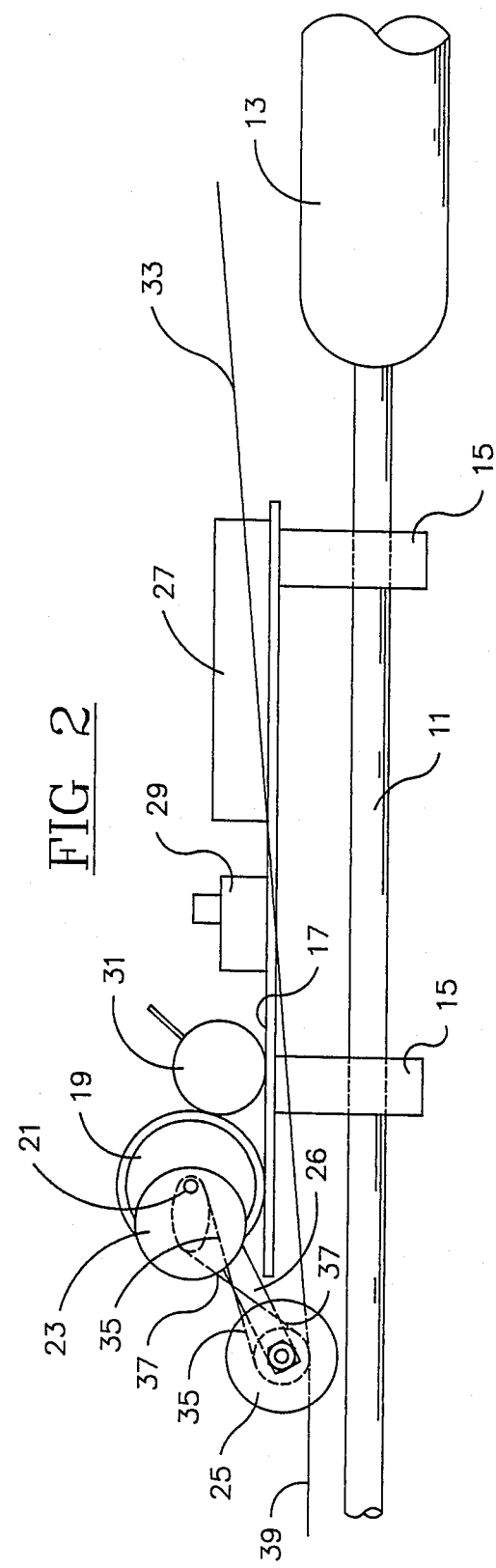

LURE ACTION ATTACHMENT FOR FISHING RODS

This invention relates to an attachment for a fishing rod to enable the bait or lure at the end of the fishing line to be activated in the water and thereby attract fish.

BACKGROUND OF THE INVENTION

There are numerous patent disclosures relating to devices for jiggling fishing lines. For example, the device disclosed in U.S. Pat. No. 2,783,576 employs a clockwork mechanism using a spring motor and escapement to vibrate an arm engaged with the line. U.S. Pat. No. 2,746,198 discloses an electric fish jigger mounted on the fishing rod and employing an electromagnetic vibrator to jiggle a lure on the surface of the water. U.S. Pat. No. 3,600,837 discloses a rod mounted electric motor driving a ratchet wheel to effect jiggling of the line. U.S. Pat. No. 2,908,103 discloses an electric lure jigger wherein a reciprocal motion of the line is obtained by a thermal switch to make and break the electrical connection. More recent disclosures are U.S. Pat. Nos. 3,789,534, 4,420,900, and U.S. Pat. No. 4,528,767, all of which electrically vibrate the line with a reciprocating motion.

Many of the above devices are difficult or expensive to build on a commercial basis and many are different to use and often interfere with paying the line out or reeling it in. Furthermore, while some of the devices of the prior art do jiggle the fishing line when out of the water, it is my experience that they are ineffective in providing significant lure action when in use in the water, presumably due to the damping effect of the water on the line motion.

OBJECTS OF THE INVENTION

It is an object of the invention to provide a lure action device which is very effective in causing a lure to swim in the water.

It is a further object to provide such a device which will not interfere with paying out or reeling in the line.

A still further object is to provide a lure action device which is easy to manufacture and which is low in cost.

BRIEF STATEMENT OF THE INVENTION

In accord with this invention, a fishing line lure activator device is provided which is adapted to fit on a conventional fishing rod and which comprises a housing for means to fix the device on the rod, a battery driven motor and an eccentric wheel and a guide wheel over which the fishing line is looped.

DESCRIPTION OF THE DRAWINGS

FIG. 1 is a plan view of the device of the invention mounted on a fishing rod.

FIG. 2 is a side elevation showing how the line is looped over the eccentric and guide wheels.

DETAILED DESCRIPTION OF THE INVENTION

Referring to FIG. 1, a fishing rod (11) with handle (13) has affixed to it by means of clamps (15, FIG. 2) a housing shown generally as 17. A motor within its own housing (19) is mounted on housing 17 and to the motor's shaft (21) is affixed an eccentric grooved wheel (23) (e.g. a pulley wheel) which is mounted on the motor shaft (21) in an offset manner so that as the motor turns, the wheel is given a reciprocating motion. An idler pulley wheel (25) is mounted on a support arm (26) in front of and in alignment with wheel 23. A receptical (27) for one or more batteries is mounted on housing 17 as is a switch 929) wired to the batteries and motor so as to activate and deactivate the motor.

Alternatively, the device may be wired to a remote source of energy such as a boat battery. Optionally, a rheostat (31) may be mounted on housing 17 and placed in the electrical circuit to control the speed of the motor and thus affect the action of the lure in the water. Also, the motor may be geared and the eccentric wheel be mounted on a gear rather than directly on the motor shaft as shown. A geared motor is particularly useful when the device is used for deep sea fishing.

The fishing line (33) which comes from a reel (not shown) mounted on handle 13 loops over eccentric wheel 23 and guide wheel 25. FIG. 2 shows in more detail how the line must be looped over the wheels for the optimum swimming motion of the lure to occur in the water. As can be seen in FIG. 2, the line 33 from the reel is taken under and over idler wheel 25 (see line 35) and then wound under the bottom and over the top of the eccentric wheel 23 (see line 37) so that the line makes a complete loop around the eccentric wheel and then back under the idler wheel, the lines 39 then leading to the rod tip (not shown). Simply winding the line over the eccentric (23) and then around the idler wheel (25) will cause vibration of the line and impart the desired lure action in air, but it will not impart lure action in the water. To achieve optimum lure action in the water it is essential that the line be threaded to make a complete loop over the eccentric as described above and this gives a pulling effect on the line which imparts the swimming lure action in the water.

It is also necessary that the line be maintained taut in use and to accomplish this, the lure is weighted sufficiently to maintain the tautness. It has been found that a weight of about $\frac{1}{8}$ to about $\frac{1}{4}$ oz. is sufficient to achieve the tautness required and for light lures a sinker of 3" to 6" above or below the lure is suitable.

An advantage of the device of this invention is that it is adaptable to lures of various sizes and weights. The degree of swimming lure action imparted to the line may be varied by several techniques. One method is to change the speed of the motor and thus the speed of the eccentric wheel by using a rheostat or a potentiometer in the circuit as already described. A second method is to adapt the motor shaft to receive eccentric wheels of different sizes or by having an adjustable eccentric. Another technique, as described above, is to gear the motor.

Still another advantage of the device of the invention is that the line is easily flipped off or put on the eccentric and idler wheels. Thus, the line will not be engaged for casting or retrieval and yet is readily threaded for action immediately after the cast is made. When a fish is caught, the line is readily disengaged from the wheels and the fish played in the usual manner.

As is clear from the above description, the device of the invention provides means to impart a swimming action to lures while relatively stationary in the water and offers advantages not obtainable heretofore. It will be understood that numerous changes and modifications may be made to the device of my invention without departing from its scope.

I claim:

1. A fishing lure activator comprising a housing and mounted on said housing, means to affix said device to a fishing rod, a battery operated electric motor wired to an on-off switch, an eccentric pulley wheel affixed to the shaft of said motor and an idler pulley wheel mounted in front of and in alignment with said eccentric wheel.

2. A fishing lure activator as in claim 1 wherein the motor speed is controlled by a rheostat or potentiometer.

3. In combination, a fishing rod and a fishing lure activator device affixed to said rod, said devices comprising a housing for a battery operated motor having an eccentric pulley wheel turned by said motor and an idler pulley wheel mounted in front of and in alignment with said eccentric wheel whereby, when a fishing line from a reel on said rod is taken under said idler wheel, then wound under the bottom and over the top of said eccentric wheel and then taken back under the idler wheel and then leading said line to the tip of said rod to a weighted lure in the water to maintain said line taut, said motor, when energized, will activate said line to impart a swimming motion to said lure.

4. The combination of claim 3 wherein the motor speed is controlled by a rheostat or potentiometer.

5. The combination of claim 3 wherein the motor is mounted on said motor shaft.

* * * * *